United States Patent [19]

(12) United States Patent
Strezov et al.

(10) Patent No.: US 10,364,394 B2
(45) Date of Patent: Jul. 30, 2019

(54) CONVERTER FOR ORGANIC MATERIALS

(71) Applicant: The Crucible Group Pty Ltd, New South Wales (AU)

(72) Inventors: Lazar Strezov, New South Wales (AU); Steve Osborn, New South Wales (AU); Joseph George Herbertson, New South Wales (AU)

(73) Assignee: The Crucible Group Pty Ltd, Mayfield, New South Wales (AU)

( * ) Notice: Subject to any disclaimer, the term of this patent is extended or adjusted under 35 U.S.C. 154(b) by 361 days.

(21) Appl. No.: 15/032,310

(22) PCT Filed: Oct. 29, 2014

(86) PCT No.: PCT/AU2014/001020
§ 371 (c)(1),
(2) Date: Apr. 26, 2016

(87) PCT Pub. No.: WO2015/061833
PCT Pub. Date: May 7, 2015

(65) Prior Publication Data
US 2016/0244674 A1    Aug. 25, 2016

(30) Foreign Application Priority Data

Oct. 29, 2013  (AU) ................................ 2013904164

(51) Int. Cl.
*C10B 47/34* (2006.01)
*C10B 47/44* (2006.01)
(Continued)

(52) U.S. Cl.
CPC .............. *C10B 53/02* (2013.01); *B65G 33/26* (2013.01); *B65G 33/34* (2013.01); *C10B 7/10* (2013.01);
(Continued)

(58) Field of Classification Search
CPC ........ C10B 47/44; B65G 33/22; B65G 33/24; B65G 47/18; B65G 47/19; C10J 2200/156; C10J 2200/158; C10J 3/007
See application file for complete search history.

(56) References Cited

U.S. PATENT DOCUMENTS 1,639,417 A    8/1927  Wallace
3,787,292 A *  1/1974  Keappler .................. C10B 1/10
                                              202/118
(Continued)

FOREIGN PATENT DOCUMENTS

WO    2009124359    10/2009
WO    2012136344    10/2012

OTHER PUBLICATIONS

International Preliminary Report on Patentability for Application No. PCT/AU2014/001020 dated Mar. 1, 2016 (19 pages).
(Continued)

*Primary Examiner* — Jonathan Miller
*Assistant Examiner* — Jonathan Luke Pilcher
(74) *Attorney, Agent, or Firm* — Michael Best & Friedrich LLP

(57) ABSTRACT

A continuous converter for pyrolyzing or otherwise processing biomass or other solid organic feed materials includes a reaction chamber (5) for producing a solid carbon-containing product and a gas product and optionally a liquid water product via pyrolysis or other reaction mechanisms from a solid organic feed material. The chamber has an inlet (41) for supplying a solid organic feed material to the chamber and separate outlets (15, 35) for the solid carbon-containing product and the gas product produced in the reaction chamber. The inlet and the solid carbon-containing product outlet are configured so that the solid materials in the inlet and in the outlet form respective gas seals in the inlet and the outlet.

16 Claims, 11 Drawing Sheets

(51) Int. Cl.
*B65G 33/00* (2006.01)
*B65G 33/24* (2006.01)
*B65G 33/26* (2006.01)
*B65G 33/30* (2006.01)
*B65G 33/34* (2006.01)
*C10B 53/02* (2006.01)
*C10B 49/02* (2006.01)
*C10B 7/10* (2006.01)
*C10B 25/24* (2006.01)
*C10B 37/04* (2006.01)
*C10B 49/04* (2006.01)
*C10J 3/06* (2006.01)

(52) U.S. Cl.
CPC ............ *C10B 25/24* (2013.01); *C10B 37/04* (2013.01); *C10B 47/44* (2013.01); *C10B 49/02* (2013.01); *C10B 49/04* (2013.01); *C10J 3/06* (2013.01); *B01J 2208/00769* (2013.01); *B65G 33/00* (2013.01); *B65G 33/24* (2013.01); *B65G 33/30* (2013.01); *C10B 47/34* (2013.01); *C10J 2300/093* (2013.01); *C10J 2300/0916* (2013.01); *C10J 2300/0946* (2013.01); *C10J 2300/0959* (2013.01); *C10J 2300/1846* (2013.01); *Y02E 50/14* (2013.01); *Y02P 20/145* (2015.11)

(56) References Cited

U.S. PATENT DOCUMENTS

| | | | |
|---|---|---|---|
| 4,123,332 A * | 10/1978 | Rotter | C10B 7/10 |
| | | | 201/15 |
| 4,943,207 A | 7/1990 | Provan et al. | |
| 4,983,278 A | 1/1991 | Cha et al. | |
| 5,017,269 A * | 5/1991 | Loomans | C10B 7/10 |
| | | | 201/25 |
| 6,184,427 B1 | 2/2001 | Klepfer et al. | |
| 2008/0217157 A1* | 9/2008 | Buchert | B09C 1/06 |
| | | | 201/2.5 |

OTHER PUBLICATIONS

International Search Report and Written Opinion for Application No. PCT/AU2014/001020 dated Nov. 27, 2014 (9 pages).

European Search Report for Application No. 14858014.5 dated Mar. 17, 2017 (7 pages).

* cited by examiner

CONVERTER FOR ORGANIC MATERIALS

TECHNICAL FIELD

The present invention relates to an apparatus in the form of a converter for continuously converting biomass or other solid organic feed materials to produce valuable products such as but not confined to any one or more of a liquid water product, a liquid oil product, a gas product, and a solid carbon-containing product such as a char product.

The present invention also relates to a method for continuously converting biomass or other solid organic feed materials via pyrolysis or other mechanism to valuable products such as but not confined to any one or more of a liquid water product, a liquid all product, a gas product, and a solid carbon-containing product such as a char product.

BACKGROUND ART

The term "organic feed materials" includes biomass, peat, coal, oil shales/sands, plastic waste materials, and also includes blends of these feed materials.

The term "biomass" is understood herein to mean living or recently living organic matter.

Specific biomass products Include, way of example, forestry products (including mill residues such as wood shavings), agricultural products, biomass produced in aquatic environments such as algae, agricultural residues such as straw, olive pits and nut shells, animal wastes, municipal and industrial residues.

The term "coal" is understood herein to include, by way of example peat, brown coal, black coal, and a range of products referred to as "coal wastes".

The term "oil shales" is understood herein to include by way of example any geological sedimentary materials containing a usable proportion of organic molecules.

The following description focuses on converting organic feed materials in the form of biomass and coal via pyrolysis. However, it is understood that the present invention is not confined to the reaction mechanism described as "pyrolysis" and extends to other reaction mechanisms for converting solid organic feed materials into any one or more of a liquid water product, a liquid oil product, a gas product, and a solid carbon-containing product such as a char product. By way of example, the present invention extends to converting solid organic feed materials via drying materials and has important applications in drying materials such as brown coal, with minimal if any pyrolysis, that have significant amounts of retained or bound water. It also extends to a degree of gasification taking place within the reaction chamber.

International application PCT/AU2009/000455 in the name of the applicant discloses a method for pyrolysing a solid organic feed material, such as biomass and coal and blends of biomass and coal, which includes the steps of:

(a) supplying the solid organic feed material to an inlet of a pyrolysis reaction chamber;
(b) moving the solid organic material through the reaction chamber from the inlet to a downstream end of the chamber and exposing the organic material to a temperature profile within the chamber that dries and pyrolyses the organic material and releases water vapour and a volatile products gas phase from the organic material as the organic material moves through the chamber;
(c) moving the water vapour phase and the volatile products gas phase produced by heating the solid organic material in step (b) through the reaction chamber in a direction counter to that of the solid organic material so that the water vapour phase and condensable components of the volatile products gas phase condense in cooler upstream sections of the chamber and form a liquid water product (water recovered from a pyrolysis process is typically somewhat acidic and contains dilute smoke chemicals and other organics; it is often referred to as pyroligneous acid or "wood vinegar" and has beneficial applications in horticulture) and a separate liquid oil product; and
(d) discharging the liquid water product and the liquid oil product via separate upstream outlets of the chamber and a dried and pyrolysed solid product from a downstream outlet in the chamber.

International application PCT/AU2009/000455 also discloses discharging a non-condensable gas product via a separate outlet of the chamber to the above-described outlet.

The term "pyrolysis" is understood in the International application and herein to mean thermal decomposition of organic material in the absence of or with limited supply of an oxidising agent such that only partial gasification is possible. This could range from "mild pyrolysis" leading to drying and partial thermal decomposition, to "full pyrolysis" resulting in oil, gas and char products. The main products of pyrolysis are gases, liquids, and char. Typically, the gases include carbon monoxide, carbon dioxide, hydrogen, and hydrocarbons. Typically, the liquids include water, tars, and oils.

The method may include generating the temperature profile in the reaction chamber by supplying an oxygen-containing gas to the reaction chamber and at least partially combusting combustible gases in the chamber.

The method may include supplying water into the downstream end of the chamber and evaporating the water and thereby recuperating heat energy in the dried and pyrolysed product and forming water vapour.

The International application also discloses an apparatus for pyrolysing an organic feed material, including biomass and coal, including blends of biomass and coal, which includes:

(a) a pyrolysis reaction chamber having an upstream end, a downstream end, an inlet for organic feed material, an outlet for gas produced in the chamber, and separate outlets for (i) a liquid oil product, (ii) a liquid water product and (iii) a dried and pyrolysed product;
(b) an assembly for moving organic material through the reaction chamber from the upstream end towards the downstream end of the chamber counter-current to the flow of gas generated in the chamber;
(c) an assembly for establishing a temperature profile in the reaction chamber that includes the following temperature zones extending successively along the length of the reaction chamber from the upstream end of the chamber: a first temperature zone for water condensation (Zone 1), a second temperature zone for water vaporisation (Zone 2), a third temperature zone for oil and tar condensation (Zone 3), and a fourth temperature zone for oil and tar vaporisation and forming the dried and pyrolysed product (Zone 4).

The disclosure in the International application is incorporated herein by cross-reference.

The above description is not to be taken as an admission of the common general knowledge in Australia and elsewhere.

SUMMARY OF THE DISCLOSURE

The applicant has carried out further research and development work into the method and the apparatus disclosed in the International application and has realised that there are a number of features that are important features from an operational and engineering viewpoint to the method and apparatus, and the applicant has developed the technology further as an apparatus in the form of a continuous converter for biomass or other solid organic feed materials, a method for continuously converting biomass or other solid organic feed materials in the converter, and a method of starting-up the converter.

In broad terms, in accordance with the present invention, biomass or other solid organic feed materials is supplied to an apparatus in the form of a continuous converter and moved through a reaction chamber of the converter as a feed material, typically in a closely packed form, and exposed to a temperature profile within the chamber that dries and pyrolyses or otherwise processes by another reaction mechanism the organic material and produces a solid carbon-containing product (such as a char product) and releases water vapour and a volatile products as phase. Typically, the converter is positioned so that the reaction chamber is horizontally disposed. It is noted that the converter, and more particularly the chamber, may be slightly inclined or vertical. The water vapour and volatile products gas phase moves counter-current to the solid organic material in the chamber so that at least a part of the water vapour and the condensable components of the volatile products in the gas phase condense in cooler upstream sections of the chamber and form liquid water and liquid oil and tar. The liquid water and the liquid oil and tar are carried forward in the reaction chamber by the feed material to the higher temperature regions of the chamber and are progressively vaporised in the case of the liquid water and progressively volatilised and cracked to hydrogen, carbon monoxide, carbon dioxide and short chain hydrocarbons such as methane, ethane, and other light hydrocarbons in the case of the liquid oil and tar. The end result of the condensation and volatilisation cycle is that a gas product comprising water vapour and non-condensable gases at the temperature and pressure within the chamber is discharged from the chamber. The gas product may include water vapour, CO, $H_2$, $CO_2$, $N_2$, methane, ethane and other light hydrocarbons. The liquid water is discharged from the chamber. Alternatively, the process may be operated so that water is discharged as water vapour only and there is no liquid water discharged from the chamber. The process of condensing water vapour at the cooler end of the moving packed bed of solid feed material, is an effective way of scrubbing water soluble contaminants from the gas, such as compounds containing S, ammonia and Cl, as well as low temperature volatile metals, including Cd, As. Hg, and Pb. Basically, the wet cooler end of the chamber is an effective scrubber. The pyrolysed solid carbon containing product is discharged from a downstream outlet in the chamber.

In broad terms, in accordance with the present invention, the apparatus in the form of a continuous converter for biomass or other solid organic feed materials includes a reaction chamber for producing a solid carbon-containing product, a gas product, and optionally a liquid water product in the chamber via pyrolysis or other reaction mechanisms, an inlet for supplying a solid organic feed material to the reaction chamber, an assembly for moving the solid organic feed material through the reaction chamber from the upstream end towards the downstream end of the chamber counter-current to the flow of gas generated in the chamber as a consequence of drying or other reactions in the chamber, and separate outlets for the solid carbon-containing product, the gas product, and optionally the liquid water product from the reaction chamber.

The features identified by the applicant include, by way of example only, the following features.

1. The continuous converter may include a device for supplying the solid feed material to the reaction chamber, hereafter called the "Intruder" and a device for discharging the solid carbon-containing product from the chamber, hereafter called the "Extruder", that are both based on the use of an assembly that is configured so that the solid material in the inlet and the solid material in the outlet form a gas seal.

2. The Intruder and the Extruder may each include two rotating screws on the same axis. The two screws may be counter-rotating. The Intruder may control the rate of supplying feed material to the reaction chamber and form a seal that minimises escape of gas from the reaction chamber via the Intruder. The seal may be created by compressing the feed material. Similarly, the Extruder may control the rate of discharging solid carbon-containing product from the reaction chamber and compresses solid carbon-containing product and forms a seal that essentially prevents escape of gas from the reaction chamber via the Extruder.

3. The following comments focus on the operation of the Intruder. The same comments apply to the Extruder. Each screw of the Intruder may be independently driven by a motor with variable speed capability, with the downstream screw running at a slower rotation rate than the upstream screw. There is an axial gap between the screws. There is no cross-sectional constriction to movement of feed material along the length of the Intruder. In use, the feed material is supplied to the upstream screw and is carried forwards to the downstream screw. The feed material is subsequently supplied to an inlet of the reaction chamber from the downstream screw of the Intruder and moved along the reaction chamber by means of a motor-driven screw assembly or other suitable assembly for moving feed material through the reaction chamber from the upstream end towards the downstream end of the chamber. The difference in the rates of rotation causes the feed material to be compressed in the gap between the screws and to enter the downstream screw as compressed material and to travel forward as compressed material via the downstream screw of the Intruder. The screws may rotate in the same direction. The screws may counter-rotate with respect to each other to prevent the compressed feed material rotating to a point where the upstream Intruder screw stalls. The extent of compression created by the Intruder may be determined by the ratio of the rates of rotation of the screws. The method and the seal quality may be controlled by setting the motor torque to a level determined to be required to deliver a required level of compression. Typically, motor torque and not rate of rotation is set for control purposes. Typically, the rate of rotation of the upstream feed screw is linked directly to the rate of rotation of the screw assembly in the reaction chamber. Typically, the rate of rotation of the downstream feed screw is controlled to maintain constant torque of the upstream screw of the Intruder. The packing density of the feed material to achieve a required seal may be dependent on a number of factors, including the characteristics of the feed material. The characteristics may include the packing characteristics of the feed material. It is noted that the opposite arrangement may be used for control purposes. Specifically, the rate of rotation of the downstream feed screw is linked directly to the rate of rotation of the screw assembly in the reaction chamber and the rate of rotation of the upstream feed screw is controlled to maintain constant torque of the downstream screw of the Intruder.

4. The same principles apply to the Extruder, in which case solid carbon-containing product from the reaction chamber is compressed and transferred out the system without gas leakage.

5. For the Extruder, the method may include a further consideration of avoiding spontaneous combustion of the solid carbon-containing product by controlling compression and the optional addition of water.

6. The continuous converter may also include a feed assembly for controlling the rate of supplying feed material from the Intruder to the reaction chamber. The feed assembly may include a transfer chute, hereinafter referred to as the distribution box, between an outlet of the Intruder and an inlet of the reaction chamber and a sweeper blade that is rotatable about a central vertical axis of the chute to control the distribution of feed material to the reaction chamber inlet. In use, feed material from the outlet of the Intruder falls downwardly into an upstream end of the reaction chamber and is moved forward, for example by means of a screw assembly in the reaction chamber, through the reaction chamber and thermally decomposed and discharged via the Extruder. Typically, the feed rate to the reaction chamber is controlled to ensure that the reaction chamber is full of feed material. The sweeper blade is important in terms of ensuring that there is a uniform distribution of feed material delivered to the inlet of the reaction chamber. The level of feed material in the distribution box is also an important consideration from an operational viewpoint. The applicant has found that the apparatus may block if the level of feed material is too high. The method may include measuring the torque on the sweeper blade to provide an indication of the level of feed material in the distribution box and adjusting the rate of rotation of the upstream screw of the Intruder to control the supply rate of feed material to maintain the desired level of feed material in the distribution box.

7. Typically, the gas product includes water vapour and non-condensable gases including carbon monoxide, carbon dioxide, hydrogen, and hydrocarbons (particularly methane). The method may include controlling gas product composition having regard to end-use requirements for the gas product. The gas product may contain varying amounts of hydrogen and methane. There may be situations in which higher concentrations of hydrogen and lower concentrations of methane are preferred. There may be other situations, for example when the gas product is used for electricity generation in an internal combustion engine, where higher concentrations of methane and lower concentrations of hydrogen are preferred. The method may include controlling the gas product composition by controlling the temperature profile in the reactor and therefore the residence time within a required temperature range.

8. Further to item 7 above, the method may include supplying steam into the downstream end of the reaction chamber to change the gas product composition to suit different uses of the gas. The steam may be supplied with oxygen-containing gas. By way of example, the method may include varying the hydrogen content in the gas feed to the reaction chamber from a lower limit of 8% to a higher limit of 50% to make the gas product suitable for use as a synthetic gas for a Fischer-Tropsch process for producing synthetic fuel. The addition of steam increases gas yield, and alters the gas product composition, at the expense of the solid carbon-containing product in situations where gas (e.g. for industrial heat and power) are more valuable than the solid carbon product (e.g. for coal substitution or soil conditioning). As a consequence, the method may be versatile across range of products and distributions, e.g. solid/gas ratios, such that a user of the method may select a gas product and a solid carbon-containing product mix to suit their purpose.

9. The process may be operated so that water is discharged as water vapour only and there is no liquid water discharged from the chamber. Consequently, the only "products" discharged from the chamber are a gas product and a solid carbon-containing product. The gas product may include water vapour, $CO$, $H_2$, $CO_2$, $N_2$, methane, ethane and other light hydrocarbons. The liquid water product is discharged from the chamber.

10. Further to item 9 above, the method may include condensing water vapour from the gas product outside the chamber and forming a liquid water product. The remaining gas product may be used as a fuel gas.

11. The method may include generating a required temperature profile in the reaction chamber by supplying an oxygen-containing gas as an oxidant to the reaction chamber in a suitable distribution profile along a section of the length of the chamber and at least partially combusting combustible gases in the chamber.

12. The method may be operated at a small negative pressure relative to atmospheric pressure at the upstream feed material end of the apparatus to prevent or minimise the risk of gas leakage from the apparatus.

13. When operating at a small negative pressure at the feed material end of the apparatus, the required seal (at the Intruder) may be defined by reference to air leakage into the reaction chamber at a given pressure in the chamber. When operating at a positive pressure at the feed end of the apparatus, the required seal may be defined by reference to gas leakage from the reaction chamber at a given pressure in the chamber.

14. Typically, the continuous converter operates at a positive pressure relative to atmospheric pressure at an outlet end of the apparatus. When operating at a positive pressure at the outlet end of the apparatus, the required seal (at the Extruder) may be defined by reference to gas leakage from the chamber at a given pressure in the chamber.

15. The continuous converter may include a screw feed assembly in the reaction chamber that includes a plurality of shafts and feed screws mounted to the shafts, with the feed screws being interleaved. This arrangement is particularly suitable for processing biomass (e.g. straw) that pyrolyses and forms sticky tar. The applicant has found that multiple interleaved shaft assemblies create a shearing action that facilitates handling these sticky tar-forming materials by preventing excessive build-up of accretions in the chamber. It is emphasised that the invention is not confined to the use of a screw feed assembly.

16. The continuous converter may include a screw feed assembly in the reaction chamber that includes a single shaft and feed screw mounted to the shaft.

17. The shaft the screw feed assembly in the reaction chamber may be formed from steel to provide a required structural support for the shaft and may include a copper section at a downstream end of the shaft to provide a required heat transfer capability. The downstream end of the shaft may include a steel tube with a hollow core, with the tube having a series of outwardly-extending axially-extending ribs, and a plurality of copper segments mounted to the steel tube between the ribs. This arrangement provides a combination of structural support and heat transfer capability. The shaft may include a plurality of openings for supplying an oxygen containing gas (including air) from the core into the chamber. The openings may extend through the steel ribs. The screw of the screw feed assembly may be mounted to the steel ribs.

18. The method may include supplying water to the downstream end of the apparatus to control solid carbon-containing product characteristics such as moisture content. For example, higher moisture contents may be desirable for solid carbon-containing products for agricultural use. Lower moisture contents may be suitable for industrial applications, such as char (e.g. for metallurgy and power generation) where water needs to be limited). Added water helps to overcome problems associated with potentially pyrohorric char (spontaneous combustion).

19. The outlet for the gas product and any outlet for the liquid product may include a series of slots extending along a part of the length of the chamber, with the width of the slots being selected to be less than the typical smallest dimension of the feed material to minimise loss of feed material via the slots. The slots may be wedgewire slots which have openings that increase in cross-sectional area from an inlet to an outlet of the slots. This arrangement minimises the risk of blockage of the slots in the event that feed material passes through the width of the slot. The positioning of the slots in the lengthwise direction of the chamber, and forming the slots as elongate slots, makes it possible for the slots to function on a self-cleaning basis. By way of example, in the event that pieces of feed material partially extend into the slots, moving material behind the slots will tend to push the pieces of feed material clear of the slots.

20. The continuous converter may include gas or electrical heating elements to pre-heat an initial charge of feed material in the main chamber to a reaction temperature before introducing oxygen-containing gas into the chamber as part of a start-up process for the converter.

21. The continuous converter may include an assembly for establishing a temperature profile in the reaction chamber that includes the following temperature zones extending successively along the length of the reaction chamber from the upstream and of the chamber: a first temperature zone for water condensation (Zone 1), a second temperature zone for water vaporisation (Zone 2), a third temperature zone for oil and tar condensation (Zone 3), and a fourth temperature zone for oil and tar vaporisation and forming the dried and pyrolysed product (Zone 4).

22. Operating the method so that the feed material is "wet" in Zones 2 and 3 make it possible to scrub the gas stream. In Zone 3 the feed material typically becomes coated with oil, and the oil coating scrubs longer chain hydrocarbons present as vapours from the gas stream. In Zone 2 the feed material is typically wet with water (partly acidic), and the water scrubs ammonia and $H_2S$ and other water-soluble, non-condensable components of the gas stream. Intimate contact of liquids with the gas to allow scrubbing of the gas stream is an important advantage.

23. The method may include in line direct use of the gas product that takes advantage of the unique composition of the gas product (i.e. containing no condensable long chain hydrocarbons—these are a processing problem) for industrial heat and power applications. The in line direct use includes the use of a specially-modified electricity generator. The modified generator may be a standard internal combustion engine generator tailored to use the gas product, such as a standard diesel engine generator converted to gas (spark plugs, etc.) and modified to deal with energy density (volume flows, de-rating etc.). The modified generator may be any other suitable apparatus.

24. Further to item 23 above, the invention extends to a method of generating electricity that includes using the continuous converter of the invention to produce a gas product (clean) having a particular composition (stronger than prevailing synthesis gases and weaker than natural gas) suitable for electricity generation and supplying the gas product to an electricity generator (e.g., a modified diesel engine generator) and producing electricity, without a gas treatment step to clean the gas to remove $H_2S$, $NH_3$, and tars.

25. The method may include removing the gas product from the reaction chamber upstream of the feed material inlet.

26. The temperature profile in the reaction chamber is an important consideration. Maintaining a required temperature profile requires balancing internal heating, process heat and heat losses. The method may include maintaining a required temperature profile in the reaction chamber by supplying an oxygen-containing gas to the reaction chamber and at least partially combusting combustible gases in the reaction chamber. The combustible gases may be generated by pyrolysis of organic material in the reaction chamber.

27. The present invention includes a method of starting up the continuous converter. The start-up method includes the following steps carried out before feed material is continuously moved through the reaction chamber: (a) filling the reaction chamber with feed material, (b) applying external heating, for example via resistance heating, to heat the reaction chamber to an ignition temperature for combustible gases released from feed material via pyrolysis of the material in the reaction chamber, (c) supplying an oxygen-containing gas (which term includes any suitable oxygen-containing gas and may include air or "pure" oxygen) to the reaction chamber at a relatively low flow rate and combusting combustible gases in the chamber and generating heat, and (d) increasing the flow rate of oxygen-containing gas as the amount of combustible gas increases in the chamber and combusting more combustible gas and ramping up the temperature in the reactor chamber to a selected operating temperature. From this point, the method generates sufficient heat from combustible gas released from feed material that external heat is no longer required for ongoing continuous operation.

Other features of the continuous converter for biomass or other solid organic feed materials and a method for continuously converting biomass or other solid organic materials in the converter of the invention are described below.

As noted above, the method may be operated until all the liquid oil product is volatilized and cracked to a non-condensable gas and there is a circulating flow of liquid water and water vapour with water vapour being the only water product discharged from the chamber, in which case, the products of the method are a solid carbon-containing product and a gas product. The gas may include water vapour, $H_2$, CO, $CO_2$, $N_2$, methane, ethane and other light hydrocarbons.

The solid carbon-containing product may be a char product.

The solid carbon-containing product may be dried coal.

The temperature profile in the reaction chamber may include a plurality of zones successively along the length of the chamber in which different reactions occur as the organic material moves from the upstream cooler end to the downstream hotter end of the chamber.

The temperature profile in the reaction chamber may include temperatures less than 100° C. in a first temperature zone (Zone 1: Water Condensation) that condenses the water vapour phase produced in the chamber and forms the above-mentioned liquid water product which is removed from the reaction chamber.

The temperature profile in the reaction chamber may include temperatures in a range of 100-150° C. in a second temperature zone (Zone 2: Water Vaporisation) in which water evaporates from the solid organic material and moves upstream as the water vapour phase to the water condensation zone.

Zones 1 and 2 may be described as a water reflux region of the reaction chamber, which provides the dewatering functions of the converter.

The temperature profile in the reaction chamber may include temperatures in a range of 150-Tx° C. in a third temperature zone (Zone 3: Oil Condensation) that decomposes the organic material and produces a part of the volatile products gas phase, where Tx is a temperature that is below condensation temperatures of condensable components of the volatile products gas phase. Hence, Zone 3 is the zone in which condensable components of the volatile products gas phase condense and form the liquid oil product, which is optionally removed from the reaction chamber.

The temperature profile in the reaction chamber may include temperatures in a range of Tx up to 600-650° C. (typically not exceeding 750° C.) in a fourth temperature zone (Zone 4: Oil Vaporisation) that decomposes the organic material and forms the dried and pyrolysed solid carbon-containing product and generates a further part of the volatile products gas phase and the above-mentioned dried and pyrolysed product.

Zones 3 and 4 may be described as an oil reflux region of the reaction chamber.

The temperature profile in the reaction chamber may include temperatures in a range decreasing from 600-650 to 100° C. in a fifth temperature zone (Zone 5: Char Cooling), with the temperature zone recuperating heat energy in the dried and pyrolysed solid carbon-containing product.

The temperature profile in the reaction chamber may include at least Zones 1-4.

The method may include injecting liquid water into the downstream end of the chamber and evaporating the water and thereby recuperating heat energy in the solid carbon-containing product with water vapour moving upstream with the gas stream.

The method may include generating the temperature profile by controlling heat transfer in the reaction chamber.

The method may include supplying the oxygen-containing gas to the reaction chamber in a region of the chamber in which there is devolatilization of organic material, such as Zone 4, whereby the devolatilization produces combustible gases that are combusted by the oxygen-containing gas. Supplying the oxygen-containing gas in this region of the reaction chamber optimises the combustion of combustible gases.

The oxygen-containing gas may be oxygen-enriched air.

The apparatus may include a condenser for condensing water from the gas product from the chamber.

The apparatus may also include a separate outlet for a liquid oil product.

The solid carbon-containing product ay be a char product.

The solid carbon-containing product may be dried coal.

The temperature profile in the reaction chamber may include a fifth temperature zone for cooling the dried and pyrolysed solid product (Zone 5) from Zone 4.

BRIEF DESCRIPTION OF THE DRAWINGS

The present invention is described further with reference to the accompanying drawings, of which.

DESCRIPTION OF EMBODIMENTS

Figure 1:
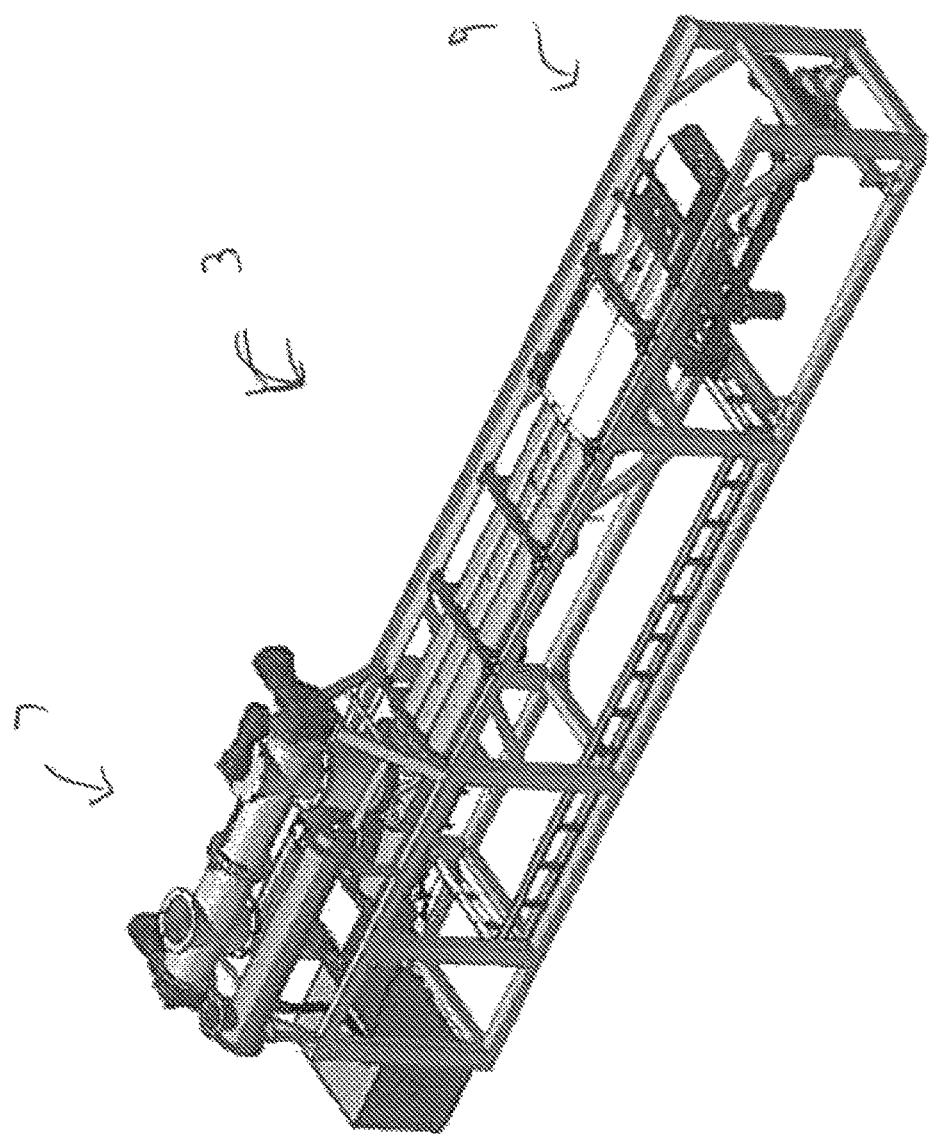
FIG. 1 is a perspective view of one embodiment of an apparatus in the form of a continuous biomass converter in accordance with the invention.
Figure 2:
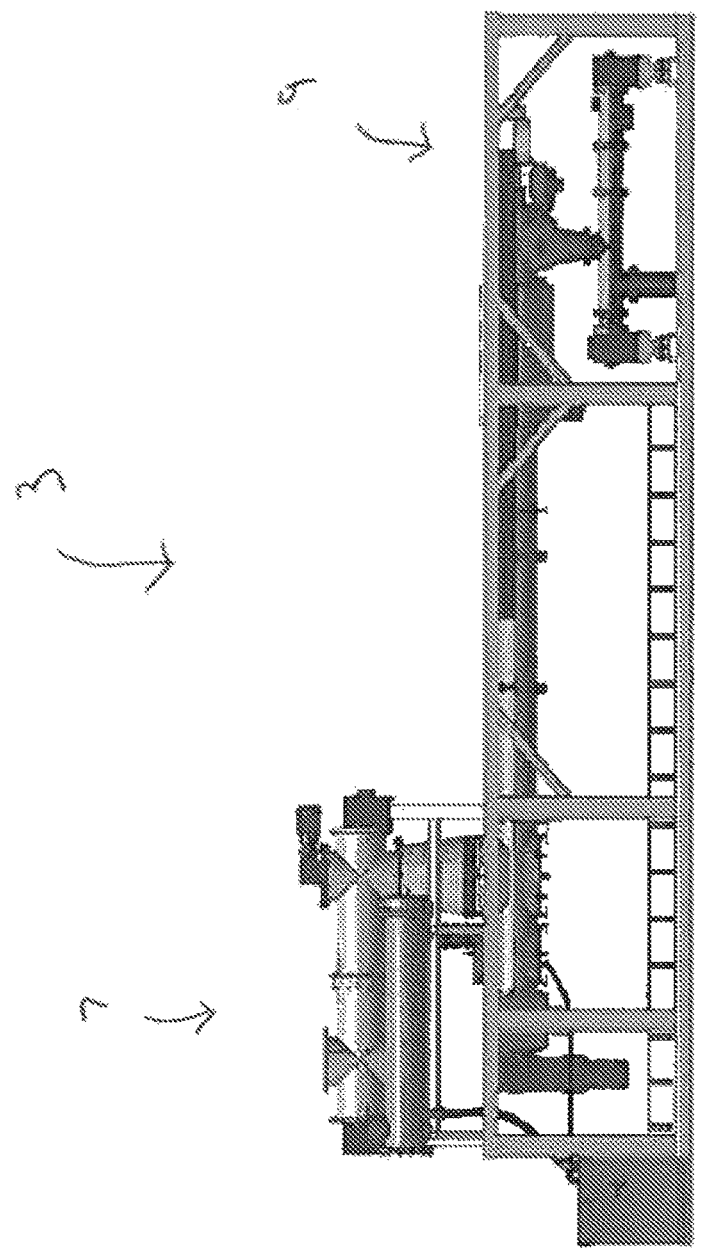
FIG. 2 is a side view of the continuous biomass converter from one side.
Figure 3:
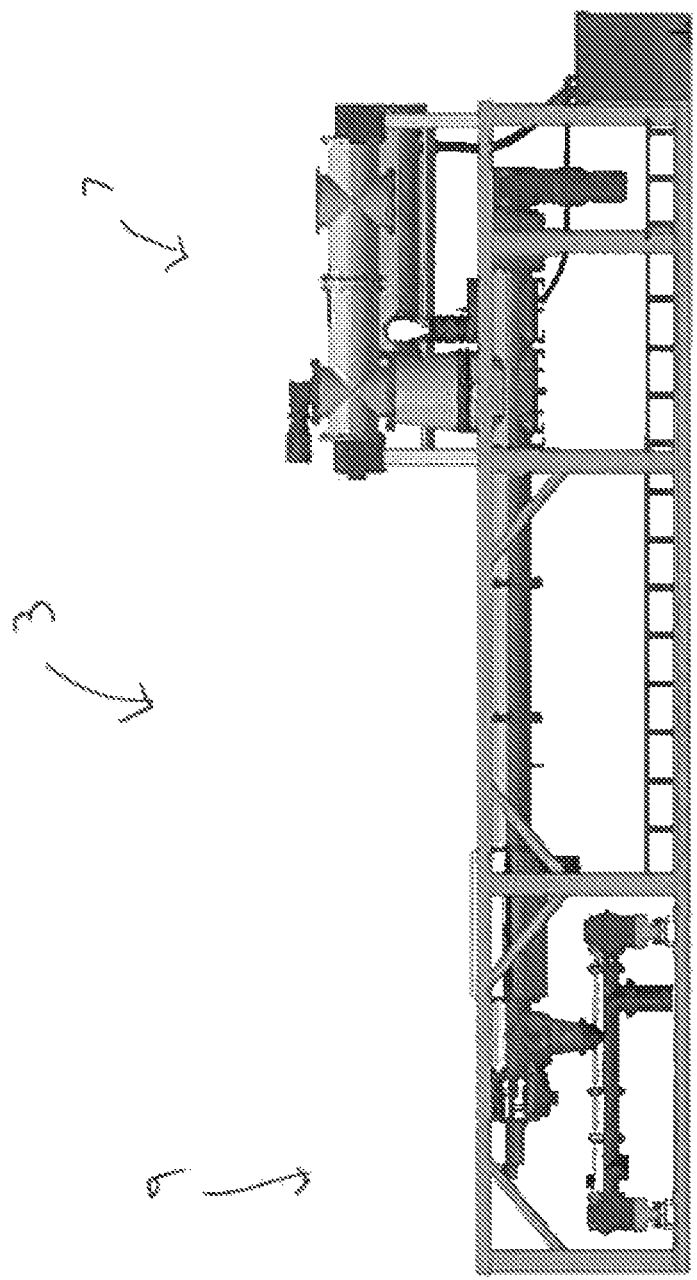
FIG. 3 is a side view of the continuous biomass converter from the other side.
Figure 4:
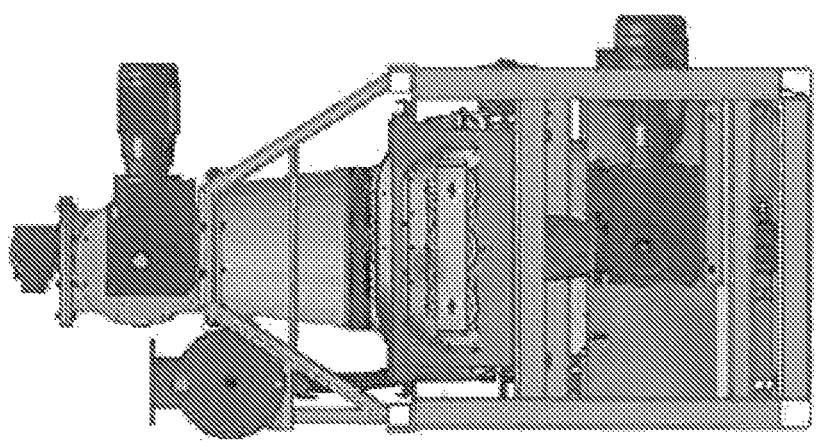
FIG. 4 is an end view of the continuous biomass converter from an outlet end.
Figure 5:
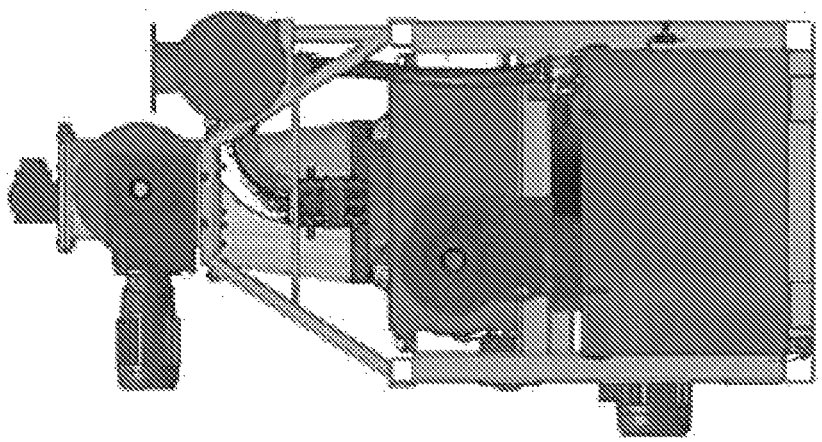
FIG. 5 is an end view of the continuous biomass converter from an inlet end.
Figure 6:
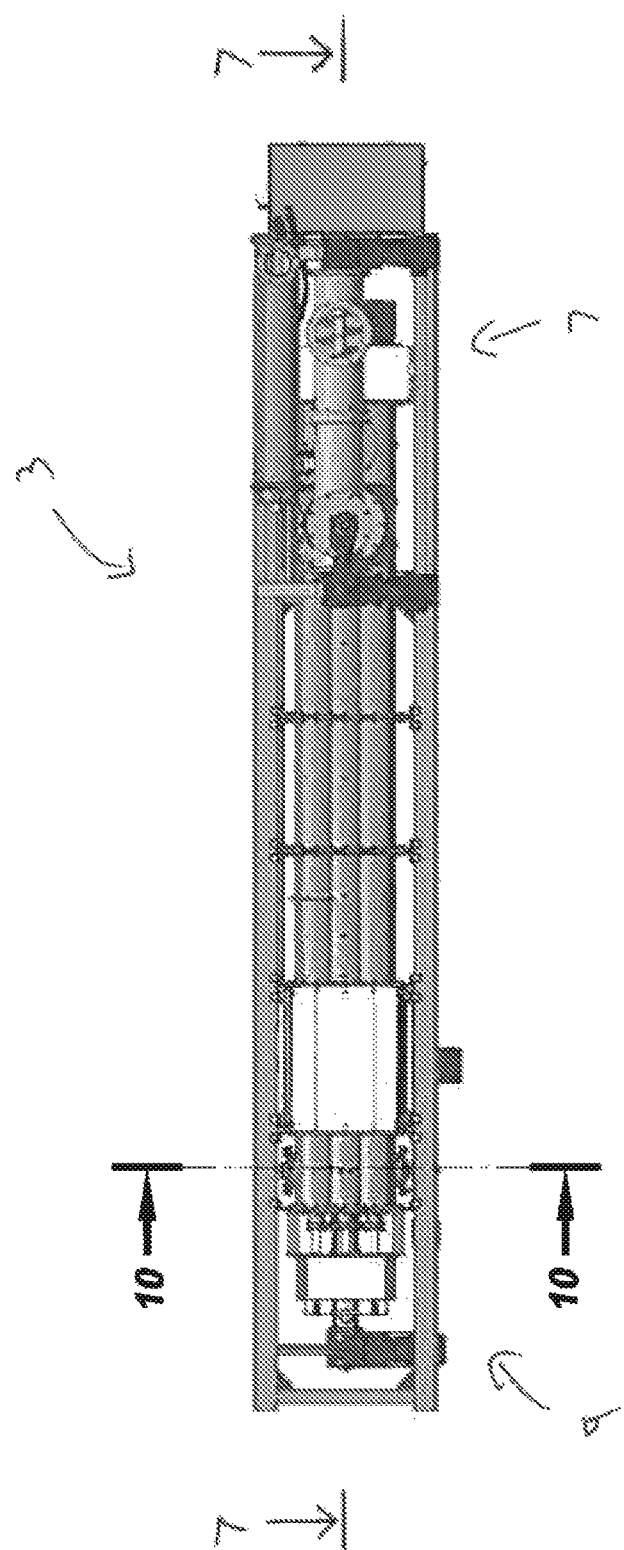
FIG. 6 is a top view of the continuous biomass converter.
Figure 7:
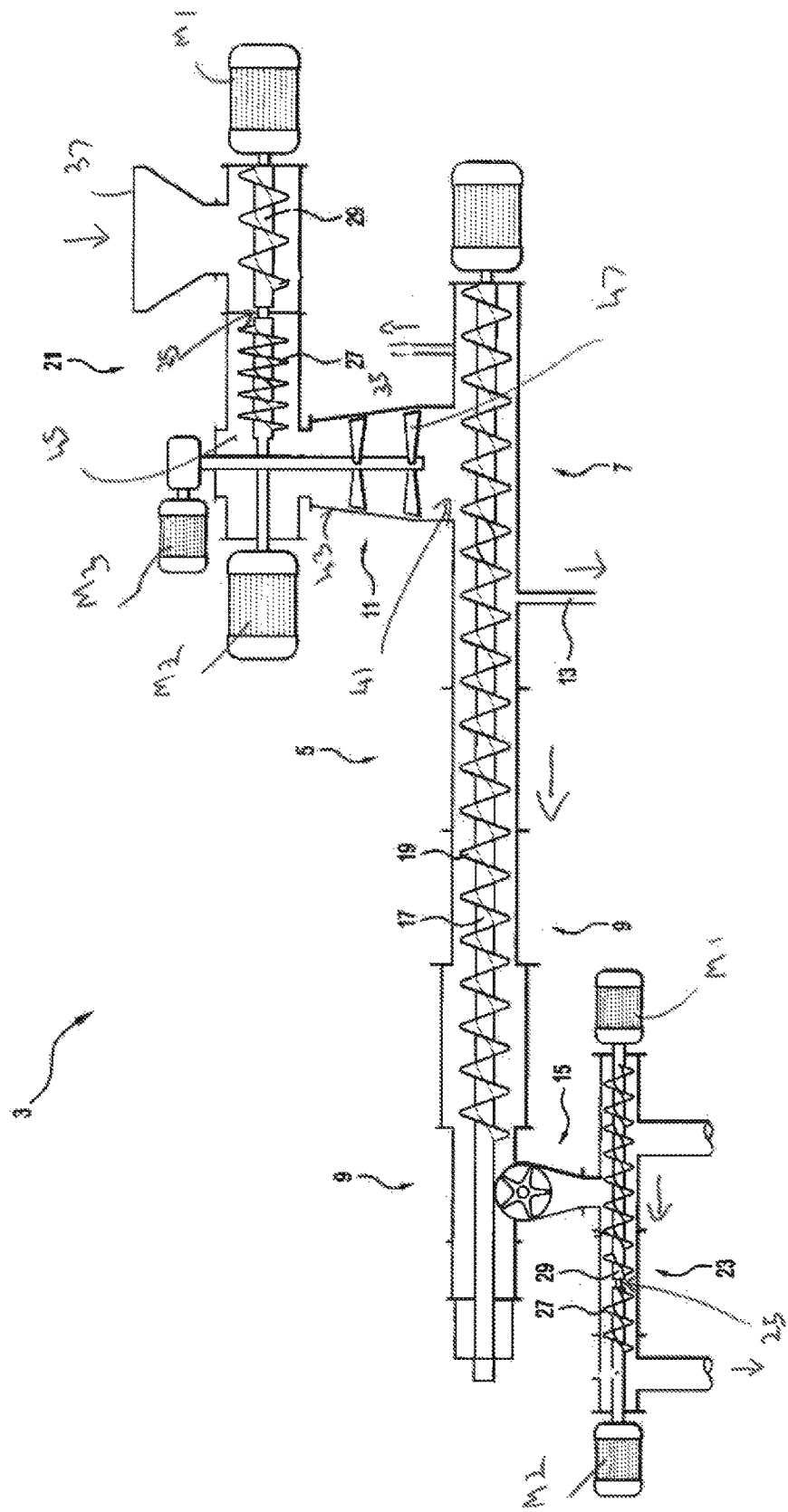
FIG. 7 is a longitudinal cross-section through the continuous biomass converter along the line 7-7 in FIG. 6.
Figure 8:
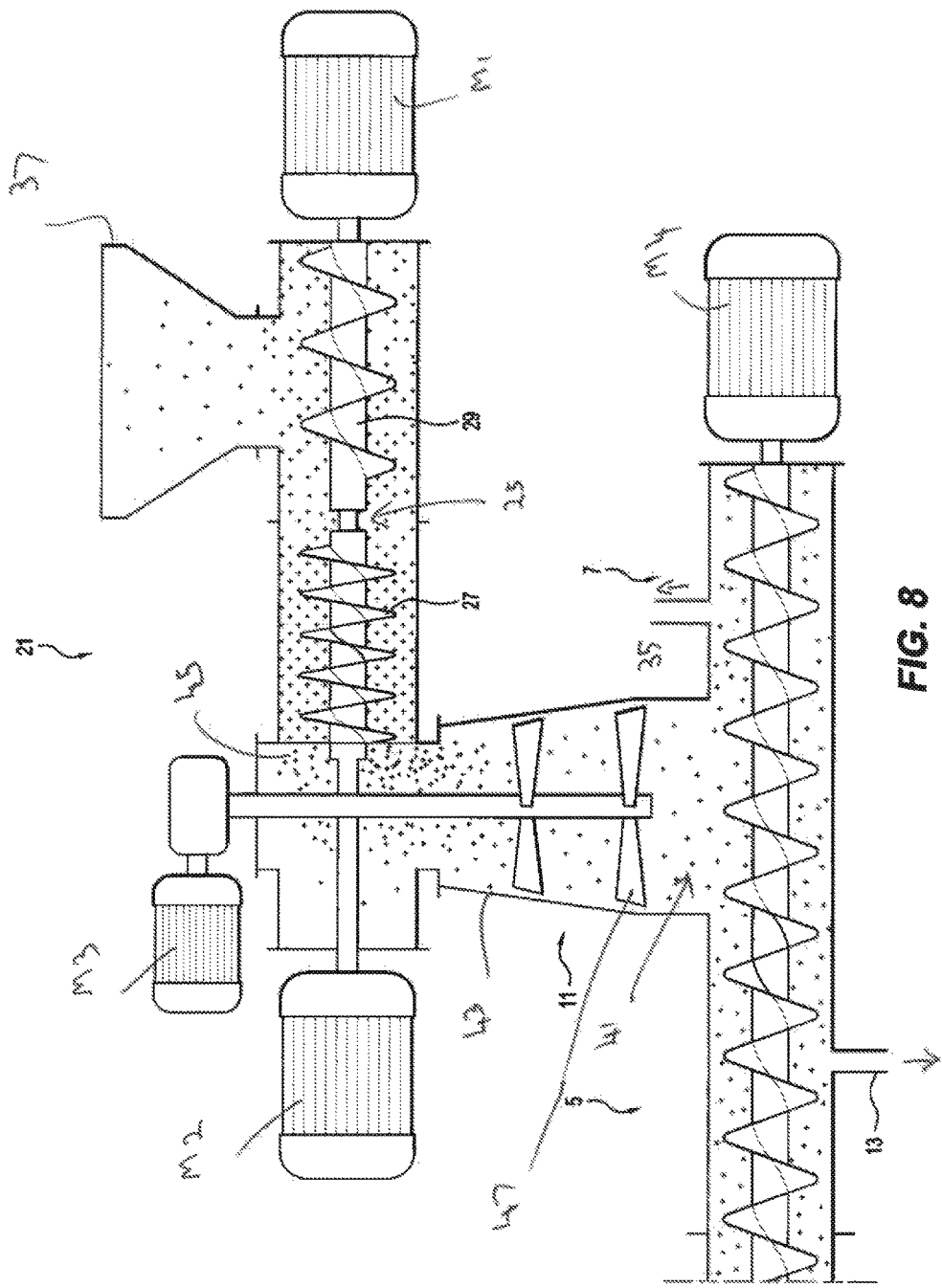
FIG. 8 is a detailed cross-sectional view of the part of FIG. 7 that shows the inlet end of the continuous biomass converter.
Figure 9:
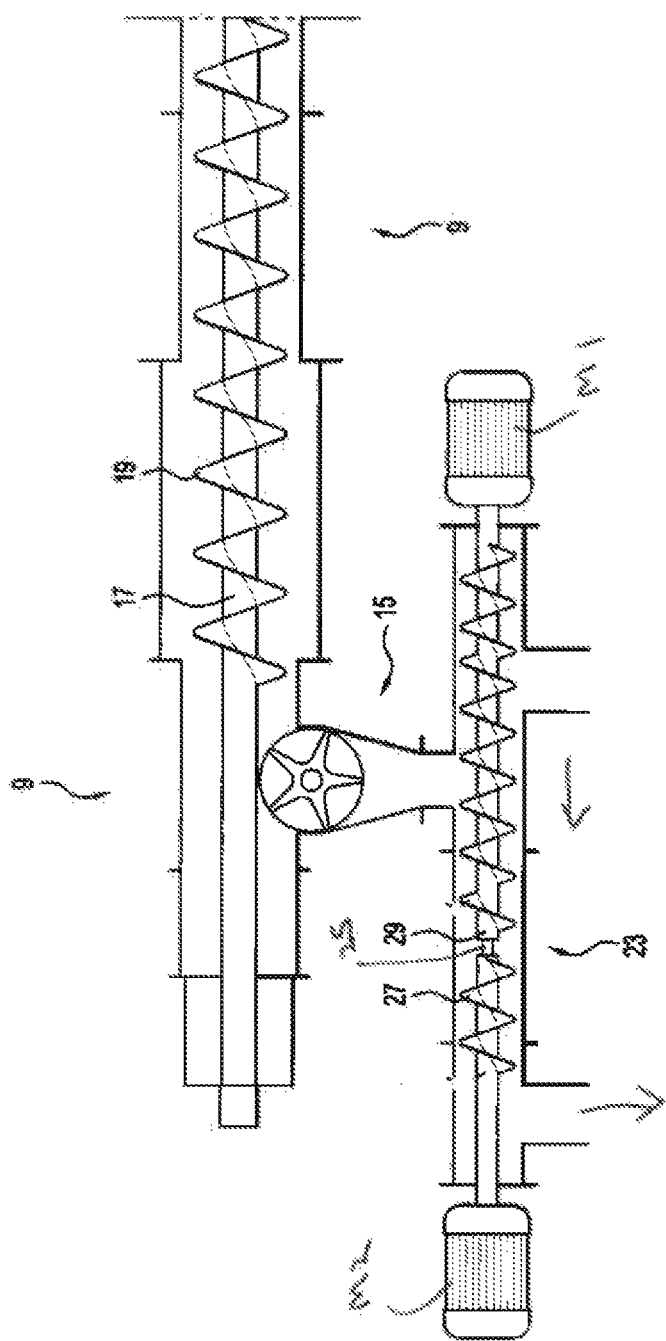
FIG. 9 is a detailed cross-sectional view of the part of FIG. 7 that shows the outlet end of the continuous biomass converter.
Figure 10:
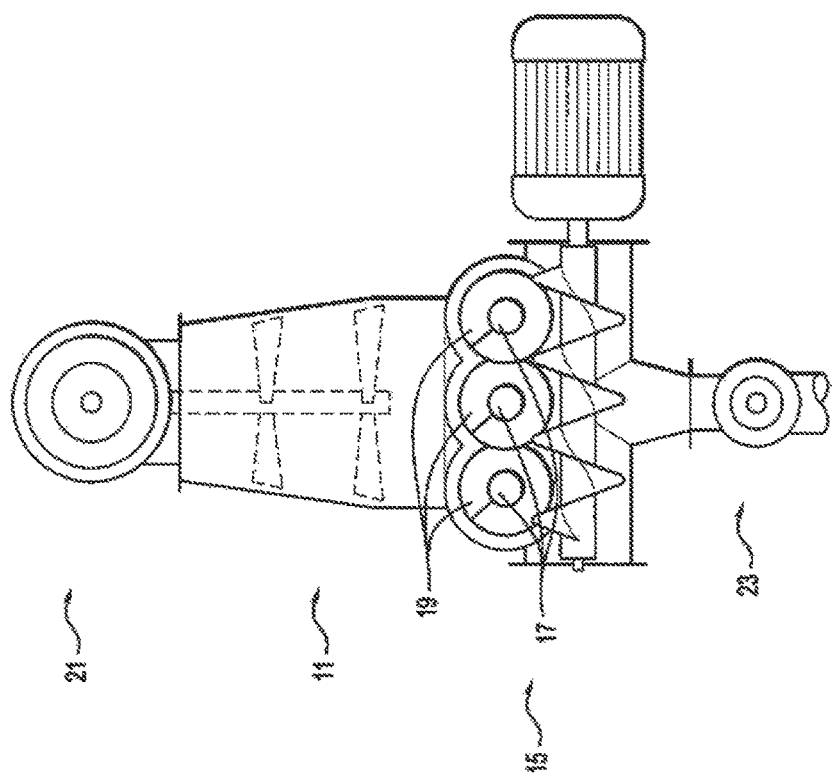
FIG. 10 is a transverse cross-section through the continuous biomass converter along the line 10-10 as shown in FIG. 6.

With reference to the Figures, the embodiment of the apparatus in the form of a continuous converter, generally identified by the numeral 3, for processing biomass or other solid organic materials shown in the Figures includes a reaction chamber 5 that has an upstream colder end 7, an inlet 41 for feed material, a downstream hotter end 9, outlets 13, 35 for discharging liquid water and gas products respectively from the chamber 5 at the upstream end, and an outlet 15 for discharging a solid carbon-containing product, for example in the form of char, at the downstream end of the chamber 5.

It is noted that, typically, the gas products stream will include water aerosols and vapours and the gas stream may be processed (e.g. by cooling) downstream of the converter 3 to remove/recover water from the gas stream. The remaining gas products stream after water condensation and separation may be used a fuel gas for electricity generation or other end-use applications. It is also noted that the process may be operated so that water is discharged as water vapour only and there is no liquid water discharged as a liquid water products stream from the chamber 5. Consequently, in this embodiment of the invention, the only "products" discharged from the chamber are a gas product and a solid carbon-containing product. The gas product may include water vapour, CO, $H_2$, $CO_2$, $N_2$, methane, ethane and other light hydrocarbons. The liquid water product is discharged from the chamber.

The converter 3 also comprises a feed hopper 37 for suppling organic feed material to the upstream end of the reaction chamber (entry to the Intruder). The feed hopper may be a sealed or an open hopper.

The converter 3 also comprises an assembly that forces feed material continuously forwardly in the reaction chamber 5 from the upstream end 7 towards the downstream end 9. The assembly comprises three parallel rotatable shafts 17 and screw feeders 19 on the shaft. The screw feeders 19 are interleaved. One shaft 19 is a motor-driven shaft via motor M4 and the other shafts 19 are linked to rotate with the driven shaft. This is a simple and reliable arrangement whereby rotation of the shafts 17 about their axes forces feed material from the upstream end towards the downstream end of the chamber 5. The feed screw arrangement can include a single or any other suitable number of multiple screws, which may or may not be interleaved.

The converter 3 also includes an intruder 21 for supplying feed material to the reaction chamber 5 and an Extruder 23 for discharging the solid carbon-containing product from the chamber 5. Each device includes two screws 27, 29 on the same axis. The screws 27, 29 are mounted to counter-rotate with respect to each other about the axis. It is noted that the screws 27, 29, may be arranged to rotate in the same direction. The screws are separated by an axial gap 25. The Intruder 21 controls the rate of supplying feed material to the reaction chamber 5 and compresses feed material and forms a seal that minimises escape of gas from the chamber 5 via the Intruder. Each screw 27, 29 is independently driven by a motor M1, M2 with variable speed capability so that in use the downstream screw 27 runs at a slower rotation rate than the upstream screw 29. The difference in the rates of rotation causes feed material supplied to the upstream screw 29 from the feed hopper 37 and transported to the gap 25 to be compressed in the gap 25 and to enter the downstream screw 27 as compressed material and to travel forward as compressed material via the downstream screw 27.

The method and the seal quality may be controlled by setting the motor torque of the motors M1 and M2 to a level determined to be required to deliver a required level of compression. Typically, motor torque and not rate of rotation is set for control purposes. Typically, the rate of rotation of the upstream screw 29 is linked directly to the rate of rotation of the motor-driven screw feeder 19 in the reaction chamber 5 to control throughput. Typically, the rate of rotation of the downstream screw 27 is controlled to maintain constant torque of the upstream screw 29 of the Intruder 21 to control compression. The packing density of the feed material to achieve a required seal may be dependent on a number of factors, including the characteristics of the feed material. The characteristics may include the packing characteristics of the feed material.

It is noted that the opposite arrangement may be used for control purposes. Specifically, the rate of rotation of the downstream screw 27 may be linked directly to the rate of rotation of the motor-driven screw feeder 19 in the reaction chamber 5 to control throughput and the rate of rotation of the upstream screw 29 may be controlled to maintain constant torque of the downstream screw 27 of the Intruder 21 to control compression.

Similarly, the Extruder 23 controls the rate of discharging solid carbon-containing product from the reaction chamber 5 and forms a seal that prevents escape of gas from the reaction chamber 5 via the Extruder 23. The Intruder 21 and the Extruder 23 have the same basic structural components and these are identified by the same reference numerals in the Figures.

The converter 3 also includes a feed assembly generally identified by the numeral 11 for controlling the flow of feed material from the Intruder 21 to the inlet 41 of the reaction chamber 5. The feed assembly 11 includes a transfer chute that is in the form of a distribution box 43 between an outlet 45 of the Intruder 21 and the inlet 41 of the reaction chamber 5 and a sweeper blade 47 that is rotatable about a central vertical axis of the distribution box 43 via operation of a motor M3 to control the distribution of feed material to the reaction chamber inlet 41.

In use, feed material from the outlet 45 of the Intruder 21 falls downwardly through the inlet 41 into an upstream end of the reaction chamber 5 and is moved forward, for example by means of an auger in the reaction chamber, through the reaction chamber 5 and is thermally decomposed and then discharged as a solid carbon-containing product from the chamber 5 via the Extruder 23, with liquid water and gas products also being produced and discharges from the chamber 5 via the outlets 13, 35 as the feed material moves through the chamber 5.

Typically, the feed rate to the reaction chamber 5 is controlled to ensure that the chamber is full of feed material.

The sweeper blade 47 is important to ensuring that there is a uniform distribution of feed material delivered to the inlet of the reaction chamber 5, i.e. so that the reaction chamber 5 is full of feed material.

The level of feed material in the distribution box 43 is also an important consideration from an operational viewpoint. The applicant has found that the apparatus may block if the level of feed material is too high.

The method of operating the converter 3 includes measuring the torque on the sweeper blade 47 to provide an indication of the level of feed material in the distribution box and adjusting the rate of rotation of the upstream screw of the Intruder 21 to control the supply rate of feed material to maintain the desired level of feed material in the distribution box 43.

The converter 3 has structural features that make it possible to establish and maintain a required temperature profile in the reaction chamber 5 to operate one embodiment of the method of the present invention in the reaction chamber 5.

In particular, important features of the converter 3 include, for example, selection of the length of the reaction chamber 5, selection of the feed (e.g. biomass) and the feed rate (i.e. organic material) through the chamber 5, providing targeted injection of oxygen-containing gas into the chamber 5, providing targeted injection of liquid water into a downstream end of the chamber 5, and providing a means for achieving internal heat transfer within the chamber.

Figure 11:
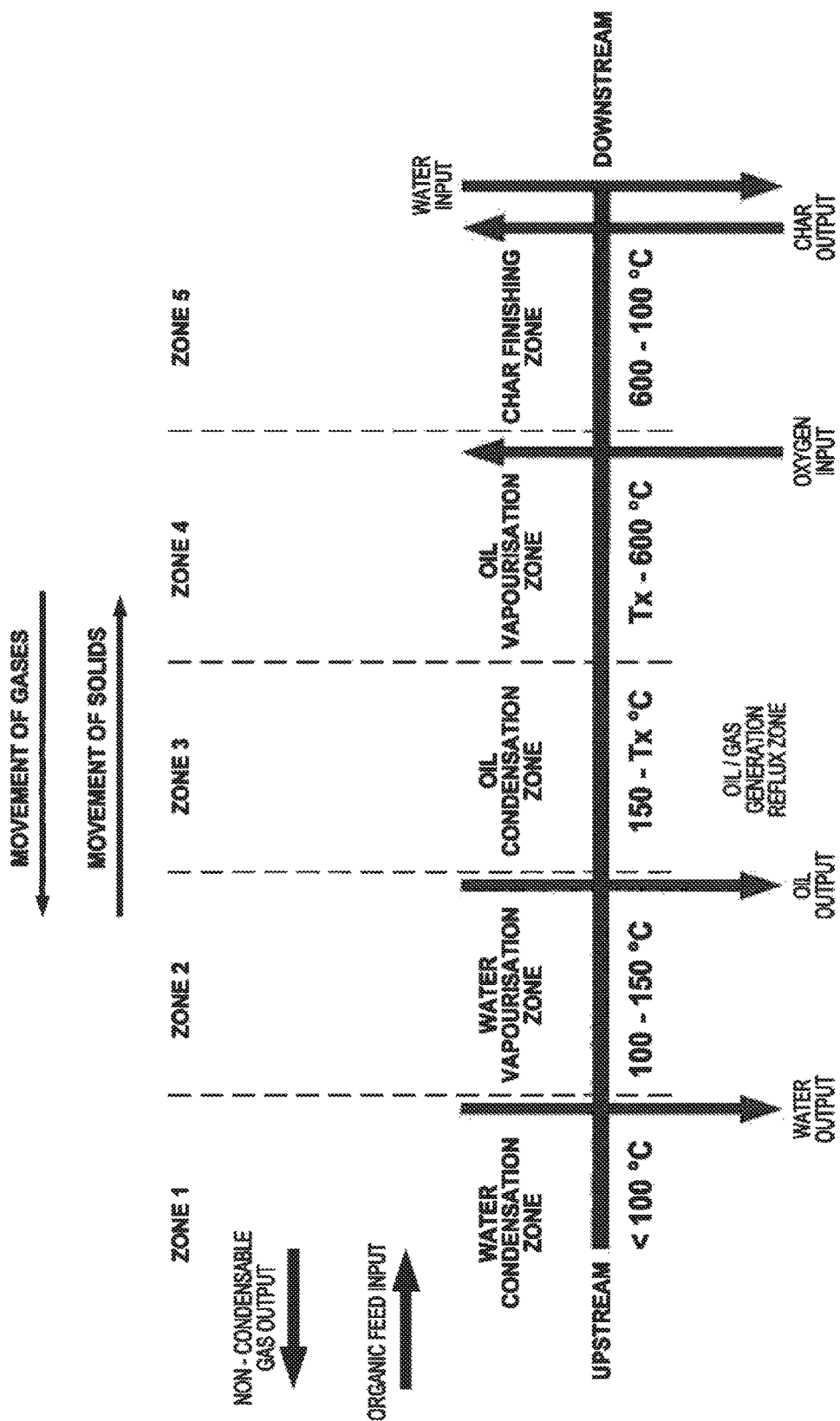
FIG. 11 is FIG. 6 of International application PCT/AU2009/000455 and is a schematic diagram of the temperature zones within the reaction chamber in accordance with an embodiment of the method of the invention.

As disclosed in International application PCT/AU2009/000455, and as is illustrated in FIG. 11, the required temperature profile for embodiments of the invention of the same general concept shown in the Figures comprises the following temperature zones successively along the length of the reaction chamber from an upstream end of the chamber: a first temperature zone for water condensation (Zone 1), a second temperature zone for water vaporisation (Zone 2), a third temperature zone for oil condensation and decomposition of organic material (Zone 3), and a fourth temperature zone for oil vaporisation and further decomposition of organic material resulting in char formation (Zone 4). The temperature profile dries organic feed material to evaporate water from the material in the second temperature zone and then decomposes the dried organic feed material progressively and condenses the gases produced by the decomposition as (a) a liquid water product in the first temperature zone and (b) a liquid oil product in the third temperature zone and ultimately forms a solid carbon-containing product in the form of a char product in the fourth temperature zone. It is noted that there are overlap regions between the respective zones shown in the Figure. Moreover, the temperature profile is typically such that the organic material is not heated to temperatures in excess of 700° C. at which there are potential safety issues arising from the prospect of forming precursors of dioxins and ultimately dioxins.

The converter 3 also comprises an assembly for establishing and maintaining a required temperature profile in the reaction chamber 5. The assembly generates heat in the reaction chamber 5 and transfers heat within the chamber 5 to establish and maintain the temperature profile in the chamber. The assembly comprises an outer solid copper sleeve (not shown) or other suitable high thermal conductivity material that is positioned around the section of the chamber 5 that forms the third and fourth temperature zones (Zone 3 and 4) of the required temperature profile. The assembly also comprises the part of the shafts 17 that are housed within the copper sleeve being formed from a high heat transfer material, such as copper. As is mentioned above, the temperature profile in the third temperature zone (Zone 3) and the downstream higher temperature zone (Zone 4) is such that there is decomposition of organic material in these zones, particularly in the higher temperature downstream end of the zone. In order to take advantage of the production of combustible gas in these zones, the assembly also comprises a device for supplying an oxygen-containing gas into the reaction chamber 5. The gas supply means comprises a series of passageways (not shown) in the shafts 17 and/or the sleeve for injecting an oxygen-containing gas, typically an air/oxygen mixture, to combust combustible gases produced by decomposition of organic material in an upstream end of the third temperature zone (Zone 3) and/or in the fourth temperature zone (Zone 4) in the reaction chamber 5. It can be appreciated that the copper section of the shafts 17 and the outer sleeve are effective means of transferring heat along the length of the chamber so that the third temperature zone is sufficiently long to provide the required temperature profile and residence time in the zone.

The converter 3 is particularly suited for a method that operates so that there is total destruction of the liquid oil product produced in the chamber. Specifically, the method is operated so that there is volatilization and cracking of liquid oil and tar product that forms in the chamber to the extent that there is total destruction of the liquid oil and tar product into a non-condensable gas that is discharged from the upstream end of the chamber.

The key elements of the above-described embodiment of the method and the apparatus of the present invention are summarised below.

Low energy use—only 5% of biomass feed energy required to operate method.

Continuous bed of packed feed material—uniform permeability across the reactor chamber at any location along the length of the chamber.

The Intruder and the Extruder make it possible to achieve continuous feed and discharge and provide effective seals.

By way of example only, biomass or coal containing up to 50% moisture (or more) can be processed directly without prior drying—(energy efficiency, lower capital, feed flexibility).

All output streams (oil (when produced), liquid water (when discharged), char and gas) leave the apparatus at separate points—therefore enabling efficient product recoveries.

The oil generated in the method may undergo refluxing within the reactor, with in situ cracking of the tars—hence enhanced product value—and may lead to total destruction of the oil to produce non-condensable gas.

The gas generated during pyrolysis is more than sufficient to meet process heat requirements—all oil (if any) and char produced in the method is therefore available for economic use—hence, the method is energy efficient and makes it possible to achieve maximum product revenues.

The option exists for "mild pyrolysis" (drying or torrification only) where the maximum temperature in the reaction chamber does not exceed Tx, that is no significant oil vaporisation takes place.

Dioxins can be avoided in the method because operating temperatures can be set to be below dioxin precursor formation—this is important from the health and safety viewpoint. Moreover, the process operates with a wet phase at the cooler end of the chamber 5 and this is an effective scrubber for dioxins and other contaminants.

Nutrients in the feed materials will mainly report to the char—therefore adding value to soil chars.

There is a high degree of feedstock flexibility for currently undervalued biomass and coal resources—as well as high moisture content feeds (e.g. most biomass resources).

A range of coarse and fine-sized input materials can be used in the method and the apparatus—typically less than 35 mm.

High mineral matter feed can be used in the method and the apparatus—mineral matter reports to char as ash, and this is not a problem when the char is used in soils.

Peat and brown coal (high moisture) and coal wastes (high mineral matter) can be used in the method and the apparatus.

The heat required to drive the method is generated internally (by combustion of some of the pyrolysis gas) such that the design is scalable to high throughputs (known technologies which apply process heat externally are constrained to about 4 tonne/hour dry biomass throughput)—(high productivity).

The production rate can be controlled/increased by changing the rate of oxygen-containing gas injection—this provides some flexibility to move from slow to flash pyrolysis conditions in the reaction chamber, with corresponding ability to alter oil (if present) and char properties and the oil:char ratio—hence flexibility in terms of a product range, which is potentially important in changing markets.

The method and the apparatus of the present invention create a completely unique thermo-chemical environment compared to known pyrolysis technologies that are commercially available or under development.

Many modifications may be made to the embodiment of the method and the apparatus of the present invention shown in the drawings without departing from the spirit and scope of the invention.

By way of example, whilst the embodiment described in relation to the drawings includes three parallel rotatable shafts 17 and interleaved screw feeders 19 on the shafts 17, the invention is not limited to this arrangement and extends to any alternative arrangements for moving feed material along the chamber 5 and is not limited to this number of rotatable shafts 17 and interleaved screw feeders 19.

By way of further example, whilst the embodiment described in relation to the drawings includes particular forms of the Intruder 21 and the Extruder 23, the invention is not limited to this arrangement and extends to any alternative arrangements for supplying feed material to the chamber 5 and discharging solid product from the chamber 5 which creates effective gas seals for the chamber 5.

By way of further example, whilst the embodiment described in relation to the drawings includes a particular feed assembly 11 for controlling the flow of feed material from the Intruder 21 to the inlet 41 of the reaction chamber 5, the invention is not limited to this arrangement and extends to any suitable alternative arrangements.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The invention claimed is:

1. An apparatus for pyrolysing or otherwise processing a solid organic feed material including:
   (a) a reaction chamber having an upstream end, a downstream end, an inlet for the organic feed material, and separate outlets for a gas product and a dried and pyrolysed solid carbon-containing product produced from the organic feed material in the chamber; and
   (b) an assembly for moving the organic material through the reaction chamber from the upstream end towards the downstream end of the chamber counter-current to a flow of gas produced in the chamber;
   (c) a supply device for supplying the solid feed material to the reaction chamber that is configured for compressing material within the supply device so that the solid material forms a gas seal, the supply device including (i) two screws on the same axis, (ii) an axial gap between the screws in which feed material is compressed in use of the supply device and (iii) a motor with variable speed capability for independently driving each screw so that in use the downstream screw runs at a slower rotation rate than the upstream screw; and
   (d) a discharge device for discharging the solid carbon-containing product from the reaction chamber that is configured for compressing material within the discharge device so that the solid product forms a gas seal.

2. The apparatus defined in claim 1, further including an outlet for a liquid water product.

3. The apparatus defined in claim 1, further including a feed assembly for controlling the rate of supplying the feed material to the reaction chamber that includes a transfer chute between an outlet of the feed material supply device and the inlet of the reaction chamber and a sweeper blade that is rotatable about a central vertical axis of the chute to control the distribution of compressed feed material to the reaction chamber inlet.

4. The apparatus defined in claim 1 wherein the discharge device includes two screws on the same axis, with the screws being adapted to counter-rotate with respect to each other, and an axial gap between the screws in which solid carbon-containing product is compressed in use of the discharge device.

5. The apparatus defined in claim 4 further including a motor with variable speed capability for independently driving each screw so that in use the downstream screw runs at a slower rotation rate than the upstream screw.

6. The apparatus defined in claim 1, further including an assembly for establishing a required temperature profile in the reaction chamber.

7. The apparatus defined in claim 6, wherein the required temperature profile includes the following temperature zones extending successively along the length of the reaction chamber from the upstream end of the chamber: a first temperature zone for water condensation (Zone 1), a second temperature zone for water vaporisation (Zone 2), a third temperature zone for oil and tar condensation (Zone 3), and a fourth temperature zone for oil and tar vaporisation and forming the dried and pyrolysed product (Zone 4).

8. The apparatus defined in claim 1, wherein the two screws are adapted to counter-rotate with respect to each other.

9. The apparatus defined in claim 1, wherein the two screws are adapted to rotate in the same direction.

10. An apparatus for pyrolysing or otherwise processing a solid organic feed material including:
    (a) a reaction chamber having an upstream end, a downstream end, an inlet for the organic feed material, and separate outlets for a gas product and a dried and pyrolysed solid carbon-containing product produced from the organic feed material in the chamber; and
    (b) an assembly for moving the organic material through the reaction chamber from the upstream end towards the downstream end of the chamber counter-current to a flow of gas produced in the chamber;
    (c) a supply device for supplying the solid feed material to the reaction chamber that is configured for compressing material within the supply device so that the solid material forms a gas seal; and
    (d) a discharge device for discharging the solid carbon-containing product from the reaction chamber that is configured for compressing material within the discharge device so that the solid product forms a gas seal, the discharge device including (i) two screws on the same axis, (ii) an axial gap between the screws in which solid carbon-containing product is compressed in use of the supply device and (iii) a motor with variable speed capability for independently driving each screw so that in use the downstream screw runs at a slower rotation rate than the upstream screw.

11. The apparatus defined in claim 10, further including an outlet for a liquid water product.

12. The apparatus defined in claim 10, further including a feed assembly for controlling the rate of supplying the feed material to the reaction chamber that includes a transfer chute between an outlet of the feed material supply device and the inlet of the reaction chamber and a sweeper blade that is rotatable about a central vertical axis of the chute to control the distribution of compressed feed material to the reaction chamber inlet.

13. The apparatus defined in claim 10, further including an assembly for establishing a required temperature profile in the reaction chamber.

14. The apparatus defined in claim 13, wherein the required temperature profile includes the following temperature zones extending successively along the length of the reaction chamber from the upstream end of the chamber: a first temperature zone for water condensation (Zone 1), a second temperature zone for water vaporisation (Zone 2), a third temperature zone for oil and tar condensation (Zone 3), and a fourth temperature zone for oil and tar vaporisation and forming the dried and pyrolysed product (Zone 4).

15. The apparatus defined in claim 10, wherein the two screws are adapted to counter-rotate with respect to each other.

16. The apparatus defined in claim 10, wherein the two screws are adapted to rotate in the same direction.

\* \* \* \* \*